US012759217B2

(12) United States Patent
Tabanelli et al.

(10) Patent No.: US 12,759,217 B2
(45) Date of Patent: Oct. 13, 2026

(54) BELLING UNIT, AUTOMATIC BELLING MACHINE COMPRISING SAID UNIT AND METHOD FOR BELLING PIPES MADE OF PVC-O

(71) Applicant: SICA S.P.A., Alfonsine (IT)

(72) Inventors: Giorgio Tabanelli, Cotignola (IT); Giovanni Vecchi, Alfonsine (IT)

(73) Assignee: SICA S.P.A., Alfonsine (IT)

(*) Notice: Subject to any disclaimer, the term of this patent is extended or adjusted under 35 U.S.C. 154(b) by 6 days.

(21) Appl. No.: 18/553,964

(22) PCT Filed: Apr. 6, 2022

(86) PCT No.: PCT/IB2022/053191
§ 371 (c)(1),
(2) Date: Oct. 4, 2023

(87) PCT Pub. No.: WO2022/214980
PCT Pub. Date: Oct. 13, 2022

(65) Prior Publication Data

US 2024/0367367 A1 Nov. 7, 2024

(30) Foreign Application Priority Data

Apr. 7, 2021 (IT) ........................ 102021000008615

(51) Int. Cl.
*B29C 57/00* (2006.01)
*B29C 57/02* (2006.01)
*B29C 57/04* (2006.01)

(52) U.S. Cl.
CPC ............ *B29C 57/04* (2013.01); *B29C 57/025* (2013.01)

(58) Field of Classification Search
CPC ....... B29C 57/00; B29C 57/005; B29C 57/02; B29C 57/04; B29C 57/06
See application file for complete search history.

(56) References Cited

U.S. PATENT DOCUMENTS 3,779,446 A 12/1973 Lemelson
4,113,813 A * 9/1978 Wilson .................... B29C 57/04 425/393

(Continued)

FOREIGN PATENT DOCUMENTS

CN 109466054 A 3/2019
CN 111002571 A 4/2020

(Continued)

OTHER PUBLICATIONS

International Search Report dated Oct. 13, 2022 from counterpart PCT App No. PCT/IB2022/053191.

(Continued)

*Primary Examiner* — Thu Khanh T. Nguyen
(74) *Attorney, Agent, or Firm* — SHUTTLEWORTH & INGERSOLL, PLC; Timothy J. Klima

(57) ABSTRACT

A unit for belling PVC-O thermoplastic pipe includes: a forming pad for deforming into bell shape an end of the pipe, the pad having a longitudinal central axis of symmetry and a region for housing an annular gasket to be coupled, internally, to the pipe; an annular contact element fitted slidably on said pad to move along the direction of the axis, between an advanced position contacting the gasket, and a withdrawn position. A first heating device heats the contact element to a predetermined temperature by contacting an inner surface of the end portion of the pipe fitted on the annular contact element. A second heating device externally heats the pipe fitted on the pad, in a predetermined zone of the pad at the end of the pipe.

19 Claims, 16 Drawing Sheets

(56) References Cited

U.S. PATENT DOCUMENTS

| | | | |
|---|---|---|---|
| 4,279,853 A | 7/1981 | Ohta | |
| 6,383,435 B2 | 5/2002 | Savioli | |
| 9,710,942 B2 | 7/2017 | Kaiami | |
| 9,733,739 B1 | 8/2017 | Yates | |
| 9,942,279 B1 | 4/2018 | Prasad | |
| 2001/0005064 A1 | 6/2001 | Savioli | |
| 2009/0200705 A1 | 8/2009 | Mora | |
| 2015/0017276 A1* | 1/2015 | Hayes, Jr. | B29C 57/04 425/392 |
| 2019/0195409 A1 | 6/2019 | Corbett, Jr. | |
| 2019/0331274 A1 | 10/2019 | Quesada | |

FOREIGN PATENT DOCUMENTS

| | | | |
|---|---|---|---|
| CN | 212602857 | U | 2/2021 |
| EP | 0930148 | A1 | 7/1999 |
| EP | 2103415 | A1 | 9/2009 |
| EP | 2368693 | A1 | 9/2011 |
| EP | 2614952 | A2 | 7/2013 |
| IT | 01305981 | B1 | 7/1999 |
| WO | 97/10942 | A1 | 3/1997 |
| WO | 97/33739 | A1 | 9/1997 |
| WO | 99/42279 | A1 | 8/1999 |
| WO | 2009074999 | A2 | 6/2009 |

OTHER PUBLICATIONS

International Search Report dated May 23, 2022 from related PCT App No. PCT/IB2022/053198.

Australian Office Action dated Aug. 29, 2025 from related Australian App No. 2022253587.

Chinese Office Action dated Nov. 13, 2025 from related Chinese App No. 202280024359.5.

Chinese Office Action dated Jan. 10, 2026 from application No. 202280024361.2.

* cited by examiner

BELLING UNIT, AUTOMATIC BELLING MACHINE COMPRISING SAID UNIT AND METHOD FOR BELLING PIPES MADE OF PVC-O

This application is the National Phase of International Application PCT/IB2022/053191 filed Apr. 6, 2022 which designated the U.S.

This application claims priority to Italian Patent Application No. 102021000008615 filed Apr. 7, 2021, which applications are incorporated by reference herein.

TECHNICAL FIELD

This invention relates to a belling unit forming part of a belling machine for pipes made of thermoplastic material, that is to say, a unit designed to deform into the shape of a bell at least one end of a pipe made of thermoplastic material (as is known, a gasket is housed in the bell and the end of another pipe is inserted, in use, to form a conduit).

In particular, the invention relates to a belling unit for thermoplastic pipes made of biaxially oriented PVC (polyvinyl chloride) (so-called PVC-O).

PVC-O pipes are produced by means of an (artificial) stressing process which allows the orientation of the long molecular chains of PVC obtained from the extrusion process along a desired direction.

BACKGROUND ART

The orientation in the longitudinal and circumferential directions obtained in the PVC-O allows the improvement of the physical properties with respect to the conventional PVC-U (rigid polyvinyl chloride). In order to cause the orientation to occur, the temperature of the pipe is increased to a value greater than the vitreous transition temperature (Tg, approximately 75°-80° C.) of the PVC and a considerable force is then applied in the pipe both in an axial direction and in a circumferential direction (in such a way as to increase the diameter of the pipe and reduce its wall thickness).

These PVC-O pipes are pipes suitable for use with pressurised fluids (even with particularly high pressures).

PVC-O pipes are, for the same nominal operating pressure of the pipe, made with a wall thickness less than the traditional PVC-U pipes (not oriented).

It should be noted that PVC-O pipes may be used, with acceptable thicknesses, for particularly high pressures (up to 25 bar).

In the sector in question, the prior art teaches the making of a bell using a method which is commonly known in the literature as "Rieber", or "Rieber system".

According to the Rieber system, a heated metal spindle, known as pad, is inserted in the end of the pipe heated beforehand (to a temperature greater than the vitreous transition temperature of the PVC) and on which a gasket has been placed, in a precise housing zone.

The housing zone, formed in the pad, is suitably configured and sized according to the specific gasket to be housed.

In PVC-O pipes, according to the Rieber system, the action which shapes the bell, and the relative seat of the gasket, is the spontaneous contraction of the molecules oriented on the forming pad and on the gasket itself.

During the first steps of forming the bell, the end of the pipe fits the metal pad and the gasket. In practice, the pad and gasket, together, constitute the mould for forming the bell.

Unlike PVC-O pipes, in PVC-U pipes, according to the prior art, once the end of the pipe to be shaped has been fitted on the assembly consisting of the pad and gasket located on the pad, the end of the pipe is definitively shaped on that assembly, exerting either a negative pressure action (thereby forming a vacuum inside the pipe fitted on the pad) and/or an overpressure action on the outer surface of the pipe (for example with pressurised fluid such as, for example, compressed air).

When cooling is complete, the gasket remains locked in the bell, becoming an integral part of it.

The gaskets used according to the Rieber system are different from the elastomeric gaskets designed, in general, to be inserted in the grooved seat of a traditional bell, that is to say, a bell shaped with a seat for the gasket to be inserted after forming and cooling the latter.

In particular, the Rieber gaskets are characterised by a structure which includes in the elastomeric material a rigid annular part—made of metal or hard plastic—with specific gasket strengthening and stiffening functions.

The Rieber system therefore makes it possible to make, with a single machine, a pipe provided with a bell complete with gasket, wherein the gasket is locked in the bell of the pipe.

Examples of Rieber belling methods in PVC-O pipes are described in patent documents EP0930148 and IT01305981 in the name of the same Applicant as this invention, as well as in other patent documents such as WO 97/33739, WO 99/42279, WO 97/10942 and EP2614952.

The method for belling PVC-O pipes, according to the Rieber system, currently finds an applicability limited to pipes for supplying pressurised fluids with thin thicknesses, for nominal operating pressures which are relatively low, not greater than 12.5 bar.

There is therefore a strongly felt need for providing a belling unit and a belling method, according to the RIEBER system, which is applicable to pipes for supplying pressurised fluids with large thicknesses, designed to be used with high nominal operating pressures, even higher than 15-20 bar, at least up to 25 bar.

In particular, the Applicant has carried out in-depth experimental studies aimed at analysing the problems of the belling method according to the RIEBER system which limited the application to pipes with a reduced wall thickness/diameter, designed to be used with relatively low nominal operating pressures.

The Applicant has therefore understood, through these experimental studies, that the bells of the PVC-O pipes (according to the Rieber system) made according to the prior art have an imperfect adhesion of the wall of the pipe to the gasket, in particular in the zone close to the edge of the bell.

The studies of the Applicant have highlighted that the imperfect adhesion of the wall of the pipe to the gasket is a consequence of the adjustment of the wall of the bell determined by the progressive cooling of the material which occurs in the step of inserting the pipe in the pad and in the gasket.

Another drawback highlighted by the studies of the Applicant lies in the internal dimension of the bell at the gasket, a dimension which is smaller than the limit which allows a regular insertion of the pipe in the bell. This drawback is determined by the radial flattening of the gasket against the pad during the step of forming the bell. In effect, the gasket, which is gripped and wrapped by the wall of the bell being formed, is subjected to the force induced by the spontaneous radial contraction of the wall of the pipe. Subsequently, with the progressive cooling of the wall of the pipe, the shape of the bell stabilises on the flattened shape of the gasket. When the cooling step is completed, the bell is completely and stably shaped on the pad and on the gasket. When the pad is extracted from the bell, whilst the plastic wall of the bell remains rigid and substantially stable in its dimensions, the gasket, which was flattened by the wall of the pipe against the pad, is free, as it is elastic, to spontaneously expand towards the inside of the bell. The result of the elastic response of the gasket is that of determining an internal diameter of the gasket in the bell which is less than the internal diameter of the free gasket not integrated in the bell. Therefore, whilst the internal dimensions of the bell conform with the functionality of the joint for the entire wall made of plastic material, the size of the internal diameter of the gasket in the bell adopts values smaller than the limits established for a functional insertion of the pipe in the joint bell. Limit values which normally correspond to the internal diameter of the non-deformed free gasket.

The machine and the method according to the invention aim to overcome the above-mentioned drawbacks for PVC-O pipes and to satisfy the needs expressed in the introduction.

DISCLOSURE OF THE INVENTION

The aim of the invention is therefore to provide a belling unit and a method for belling which operates according to the Rieber system and which is applicable, in an efficient manner, also to pipes for supplying pressurised fluids with large wall thicknesses, for high nominal operating pressures.

A further aim of the invention is to provide a belling unit and a method for belling—which operates according to the Rieber system—in a particularly efficient manner and which is able to produce a pipe with a high quality bell.

These aims and others, which are more apparent in the description which follows, are achieved by a belling machine and by a method for belling pipes made of thermoplastic material comprising the technical features described in one or more of the appended claims.

BRIEF DESCRIPTION OF DRAWINGS

The technical features of the invention, according to the aforesaid aims, are clearly disclosed in the claims below, and their advantages will become more evident in the detailed description that follows, with reference to the accompanying drawings which represent one embodiment provided as a non-binding example, wherein:

DETAILED DESCRIPTION OF PREFERRED EMBODIMENTS OF THE INVENTION

Figure 1:
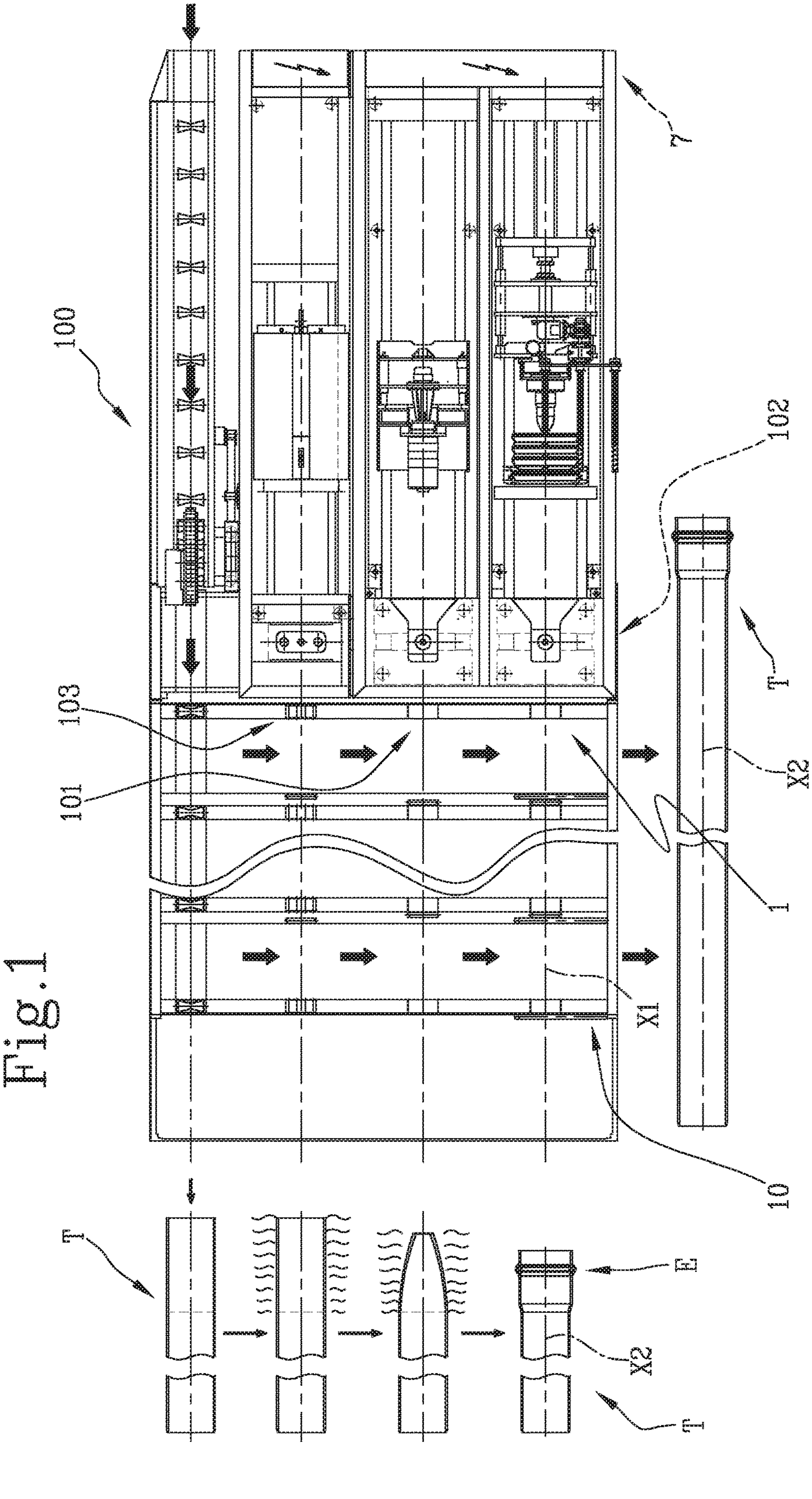
FIG. 1 is a partial plan view of a belling machine according to the invention.
Figure 2:
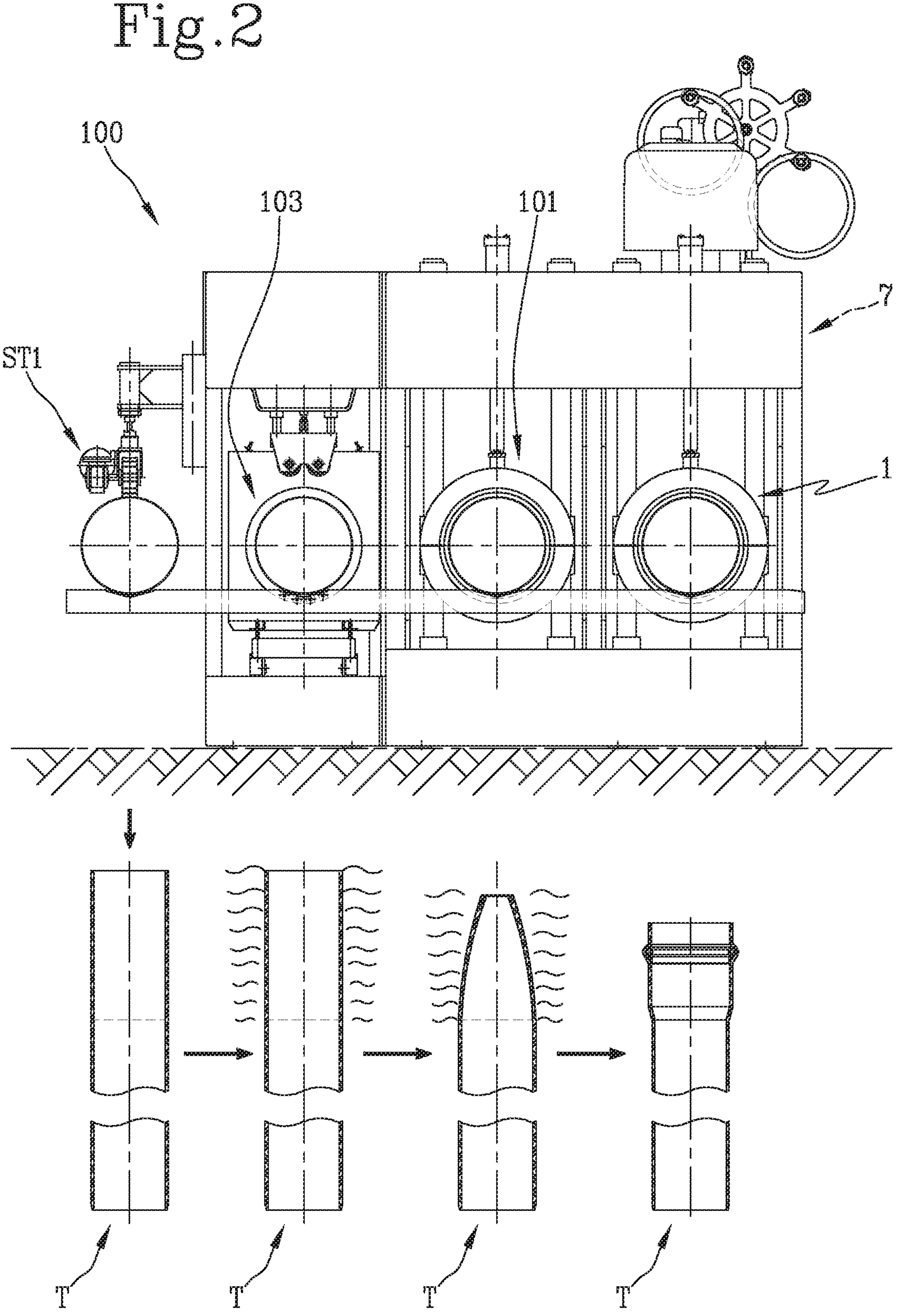
FIG. 2 is a partial front view of the belling machine of FIG. 1.

With reference to the accompanying drawings, the numeral 100 denotes a belling machine designed to be installed in a plant for producing pipes T made of thermoplastic material.

The machine 100 is able to make a bell at an end E of a pipe T incorporating a gasket G according to the RIEBER system.

The machine 100 for belling pipes T made of thermoplastic material of the PVC-O type, comprises:

- a unit 101 for heating the pipe to a predetermined heating temperature;
- a belling unit 1 (which is described in more detail below);
- a unit 102 for cooling the pipe, associated with said belling unit 1 for cooling the pipe T fitted on a forming pad 2 (described in more detail below and forming part of the belling unit 1).

According to another aspect, the machine 1 comprises a pre-heating unit 103, positioned upstream of the heating unit 101, and configured for heating the pipe T to a predetermined pre-heating temperature, which is lower than the heating temperature.

The belling machine 100 comprises a plurality of stations, operating in sequence on the pipe T (in particular on its end E).

The first station ST1 for receiving the pipe is configured for picking up the pipe T (suitably cut) from the extrusion line.

The first station for receiving the pipe therefore comprises, for this purpose, a pick-up unit.

The machine comprises a pre-heating station, wherein the unit 103 for pre-heating the pipe T is operatively active, in which the pipe T is positioned after the first station for receiving the pipe.

In the pre-heating station, the pipe T is heated preferably to a temperature lower than the vitreous transition temperature (Tg) of the PVC.

The machine also comprises a heating station, wherein the unit 101 for heating the pipe T is operatively active.

The pipe T is positioned in the heating station after the pre-heating station.

In this pre-heating station, the pipe T is heated to a temperature higher than the vitreous transition temperature of the PVC, and in any case higher than the pre-heating temperature.

It should be noted that the presence of a pre-heating station is optional, as the machine 100 may also comprise only a heating station.

Preferably, the pre-heating unit 103 comprises an oven.

Preferably, the heating unit 101 comprises an oven.

Preferably, the oven is a contact oven.

The oven performs the final heating of the end of the pipe T in a differentiated manner along the longitudinal direction of the pipe.

The heating station also comprises an inner contact element, which is positioned inside the pipe to support internally the end of the pipe T during the heating, and prevent the diametric contraction of the pipe.

At the end of the heating step the temperature of the pipe T is approximately 100° C. towards the end and decreases to 80° C. in the zone which will constitute the connecting wall between pipe and bell.

The invention relates to a unit 1 for belling pipes T made of thermoplastic material of the PVC-O type (forming part of the machine 100) comprising:

- forming pad 2 for deforming into the shape of a bell B an end portion E of a pipe T made of thermoplastic material, said pad 2 having a longitudinal central axis X1 of symmetry and a region 3 for housing an annular gasket G designed to be coupled, internally, to the pipe T made of thermoplastic material (according to the Rieber system);
- an annular contact element 4 fitted slidably on said pad 2 to move along the direction of said longitudinal central axis X1, between an advanced position P1, and a withdrawn position P2;
- a first heating device 6, configured for heating the annular contact element 4 to a temperature (greater than the vitreous transition temperature) and heating by contact the inner surface of the portion of the end pipe T fitted on the annular contact element 4.
- a second heating device 5, configured for heating from the outside said pipe T made of thermoplastic material fitted on the forming pad 2, in a predetermined zone of the pad 2 (more specifically, in a zone which extends from the zone proximal to the region 3 for housing said annular gasket G up to the end edge C of the pipe T)

It should be noted that the assembly made up of the first heating device 6 and the second heating device 5 makes it possible to define a hot (cylindrical) chamber 21.

With reference to the second heating device 5, it should be noted that the device comprises, preferably, an annular heating element 12.

Said annular heating element 12 is preferably made of metallic material (preferably an aluminium alloy).

The second heating device 5 may comprise a plurality of heating elements 20, positioned in (around, or embedded in) said annular heating element 12, for generating heat from a plurality of different zones.

According to a variant, the second heating device 5 may comprise a single electrical resistance, positioned in (around, or embedded in) said annular heating element 12.

The electrical resistance(s) is/are configured for uniformly heating the annular heating element 12.

The second heating device 5 heats, from the outside, preferably the end zone of the pipe T, from the end edge C of the pipe T up to the seat of the gasket G.

The annular heating element 12 is configured for forming with the annular contact element 4, heated by the device 6, the hot chamber (cylindrical) 21.

This hot chamber 21 is preferably sized to contain internally a portion of the end pipe T fitted on the annular contact element 4.

The wall of the end zone of the pipe T is therefore contained in the hot chamber 21, with the relative inner surface in contact with the surface of the annular contact element 4 and with the adjacent outer surface detached from the inner surface of the annular heating element 12.

It should be noted that the predetermined distance between the outer surface of the wall of the pipe T and the inner surface of the annular heating element 12 allows the insertion in the hot chamber 21 of the wall of the pipe without interference (without contact) with the annular heating element 12.

Experimental tests have led to the conclusion that the optimum distance between the wall of the pipe T and the inner surface of the annular heating element 12 is between 0.5 and 10 mm; more preferably between 1 and 8 mm; still more preferably, between 2 and 6 mm.

The annular heating element 12 is positioned in such a way that the distance between the wall of the pipe T and the inner surface renders negligible the convective effects generated by the hot air, which would disturb the transmission of heat towards the pipe T.

The transmission of heat from the annular heating element 12 to the pipe T occurs mainly by irradiation.

Preferably, the second heating device 5 heats the end zone of the pipe T in the absence of contact (the pipe is preferably positioned not in contact with the annular heating element 12).

Preferably, the second heating device 5 heats the end zone of the pipe T by irradiation.

Experimentally and advantageously, it has been found that the fact of heating, from the inside the end zone of the pipe T fitted on the annular contact element 4 by contact with the element 4 (heated by the device 6) and from the outside using the heating element 12 heated by the device 5, during the operation for shaping the bell, more specifically, with a homogeneous heating and at a predetermined temperature, it allows the belling of PVC-O to be considerably improved, allowing the formation of bells in pipes made of PVC-O with larger dimensions than those which can be processed according to conventional techniques.

The unit 1 according to the invention is therefore able to process PVC-O pipes with large diameters/wall thicknesses.

According to another aspect, the forming pad 2 is equipped with a first annular seat S1 for housing at least a part of said gasket G.

According to yet another aspect, the annular contact element 4 is equipped with a second seat S2 for housing the gasket G, configured to house at least a part of said gasket G.

Advantageously, the seats S1 and S2 are shaped for receiving respective portions of the gasket G.

In particular, the seats S1 and S2 are shaped to allow the maximum adhesion between the gasket and, respectively, the forming pad 2 and the annular contact element 4. The technical effects determined by the presence of the second seat S2 for housing the gasket G and the first annular seat S1 for housing the gasket G are described below.

It has been found experimentally by the Applicant that the presence of the second seat S2 for housing the gasket G facilitates the insertion of the pipe T on the pad 2 and on the gasket G, reducing in a certain way (as far as possible) the risk that the gasket G can undergo serious damage, as a result of the forces originating by contact with the pipe T.

The second seat S2 limits, in effect, the deformation of the gasket which occurs when the pipe T is fitted on it, receiving a part inside it.

Preferably, the second seat S2 has a concave shape towards the distal part of the pad 2 (that is, towards the clamp 10).

The first annular housing seat S1 substantially has the same technical effect described above with regard to the second seat S2.

The first annular housing seat S1 therefore contributes to the technical effect of limiting the deformation of the gasket G during the belling, receiving a part inside it, thereby reducing the risk of excessive deformation of the gasket.

According to yet another aspect, the unit 1 comprises a control and operating unit 7 (electronic, comprising hardware and/or software).

According to yet another aspect, the belling unit 1 comprises a first (temperature) sensor 9 configured for measuring the temperature at said first heating device 6 (more precisely for measuring the temperature of the annular contact element 4).

According to another aspect, the unit 1 comprises a second (temperature) sensor 8 configured for measuring the temperature at said second heating device 5.

Preferably, but not necessarily, the first sensor 9 is a thermocouple.

Preferably, but not necessarily, the second sensor 8 is a thermocouple.

The control and operating unit 7 is configured for adjusting the second heating device 5 as a function of a temperature value measured by the second sensor 8, to perform a heating of a portion of the pipe T at the region 3 for housing said annular gasket G and extended up to the end edge C of the pipe T to a predetermined temperature.

The control and operating unit 7 is configured for adjusting said first heating device 6 as a function of a temperature value measured by the first sensor 9, to perform a heating of the annular contact element 4 to a predetermined temperature (higher than the vitreous transition temperature).

According to yet another aspect, the apparatus 1 comprises a clamp 10 for clamping the pipe.

Said clamp 10 is provided with clamping jaws (10A, 10B), movable relative to each other between a closed configuration and an open configuration (in particular, preferably, a first and a second jaw).

The clamping clamp 10 constrains the pipe T in a horizontal position in such a way that the longitudinal axis X2 of the pipe T coincides with the axis X1 of the forming pad 2.

According to another aspect, the forming pad 2, the annular contact element 4 are supported by a carriage 11.

More specifically, the forming pad 2, the annular contact element 4, the second heater 5 and the first heater 6 are supported by the carriage 11 (movably relative to the frame of the machine).

It should be noted that the annular contact element 4 is configured to be able to move relative to the carriage 11, that is, relative to the forming pad 2.

More specifically, the annular contact element 4 is supported by the carriage 11 with the possibility of movement independently of it.

Preferably, the annular contact element 4 and the second heater 5 are integral with each other (that is, always moved as one) in the movement with respect to the pad 2.

According to another embodiment, the second heater 5 can be moved independently of the first heater 6 as it moves relative to the pad 2.

This last embodiment offers the advantage of a greater adaptability to variations in the operating conditions; more specifically, when the annular contact element 4 withdraws and detaches from the pipe T the second heating device 5 may remain in the heating position, providing a heating contribution on the part of the pipe which under spontaneous contraction forms on the gasket and pad.

As a result, the spontaneous contraction effect of the end wall of the pipe is increased.

The carriage 11 is configured to be movable between a position P4 close to the pipe T and a position P5 away from the pipe T.

The carriage 11 is driven by respective actuator means (not illustrated).

With reference to the annular contact element 4, it should be noted that, preferably, the annular contact element 4 is a hollow cylindrical body (preferably made of metal).

More specifically, it should be noted that the annular contact element 4 is mounted on the carriage 11 movably relative to the forming pad 2: in other words, the forming pad 2 and the annular contact element 4 are configured to be able to move independently.

The annular contact element 4 is slidable on the forming pad 2; more precisely, the inner surface of the annular contact element 4 slides on the outer surface of the forming pad 2.

With reference to the fitting of the gasket on the forming pad 2, the unit 1 may comprise means for picking up and moving the gasket G, not illustrated since it is of the conventional type.

With reference to the gasket G, it should be noted that it is positioned, before the pipe T is fitted on the pad 2, in the region 3 for housing the pad 2.

The housing region 3 is defined by a lowered zone formed on the outer surface of the pad 2.

The gasket G preferably comprises an elastomeric portion G1 and a reinforced portion G2, made of a different material.

Preferably, the reinforced portion G2 is made of plastic or metallic material.

The reinforced portion G2 is positioned, preferably, in the rear shoulder of the gasket.

Figure 3A:
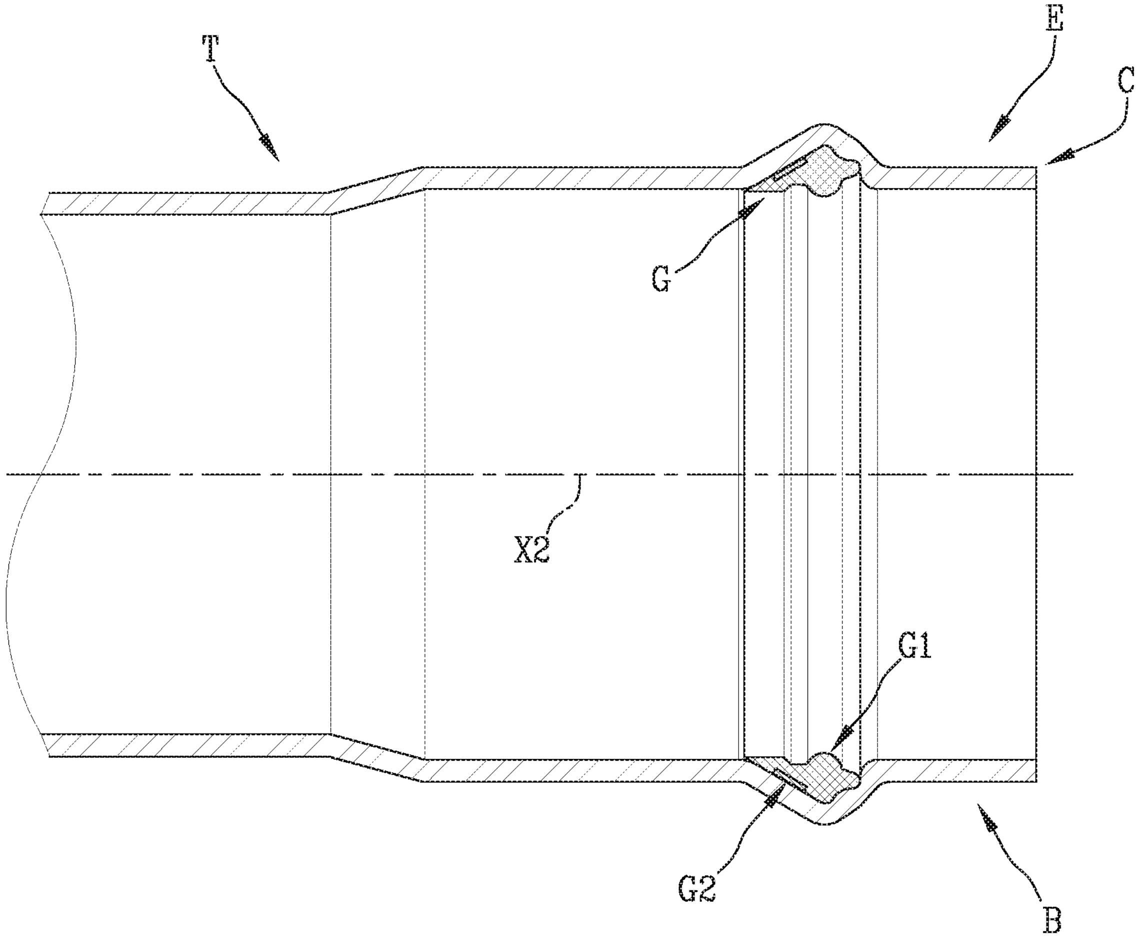
FIG. 3A illustrates a thermoplastic pipe made of PVC-O having a bell-shaped end, made according to the belling unit and the method according to the invention.
Figure 3B:
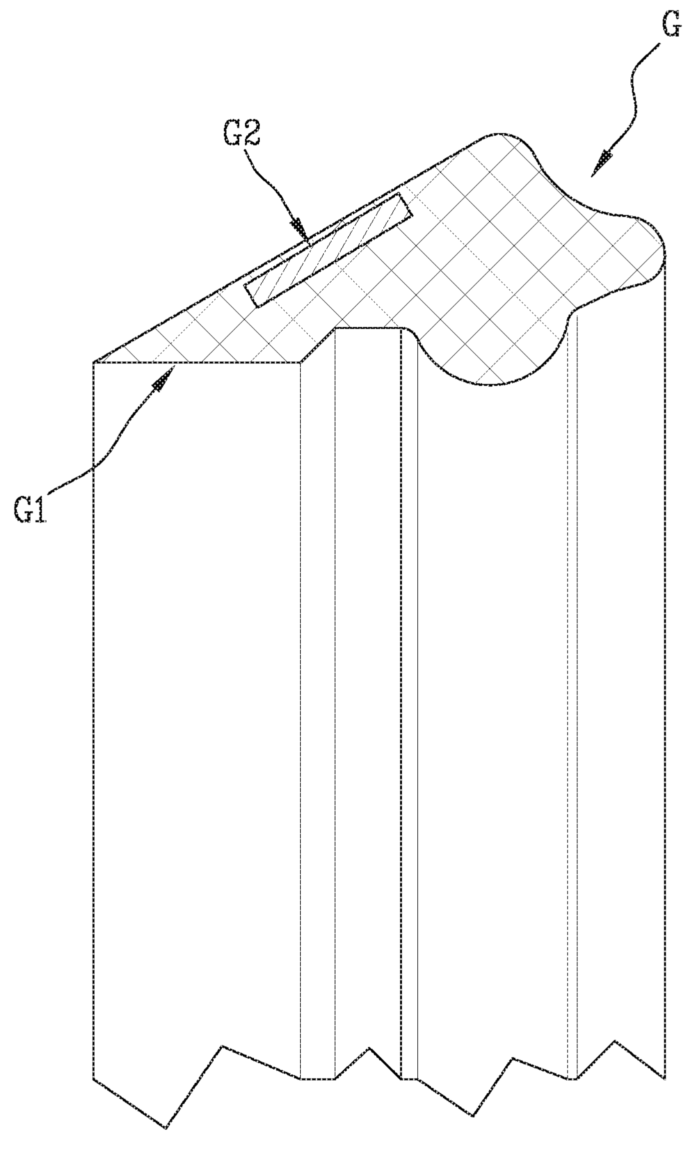
FIG. 3B is a cross section of a gasket which can be used for making the deformed bell-shaped thermoplastic pipe of FIG. 3A.

In the case illustrated in FIG. 3B, the reinforced portion G2 is embedded in the elastomeric portion G1 of the gasket G.

The reinforced portion G2 preferably comprises a metal ring.

With reference to the pad 2, it should be noted that the unit 1 comprises a heater configured for heating the forming pad 2.

The pad 2 may be heated, according to a non-limiting example, by means of an internal circuit 13 for circulating a heating fluid (for example, water).

Preferably, the pad 2 is heated to temperatures of between 40° C. and 65° C. (below the vitreous transition temperature of PVC-O).

Still more preferably, the pad 2 is heated to a temperature of between 45° C. and 60° C. (or alternatively to temperatures of between 45° C. and 55° C.).

With reference to the annular contact element 4, it should be noted that it is preferably heated (by the first heating device 6) to a temperature of between 85° and 105° C. (more preferably between 90° and 100° C., even more preferably between 92° C. and 100° C.).

By way of example, the first heating device 6 is defined by electrical resistors 22.

The electrical resistors 22 are controlled by the control and operating unit 7.

The invention provides a method for belling pipes T made of thermoplastic material of the PVC-O type, comprising the following steps:

- preparing a forming pad 2 designed to deform into the shape of a bell an end portion E of a pipe T made of thermoplastic material;
- preparing an annular contact element 4, fitted on said forming pad 2, and movable along said forming pad 2 between an advanced position P1, and a withdrawn position P2;
- preparing an annular gasket G on said forming pad 2 in a predetermined region 3, said annular gasket G being designed to be stably positioned in the bell B to be formed (integral with the pipe T),
- positioning said annular contact element 4 in the advanced position P1 to make contact with the gasket G prepared in the region 3;

- preparing a pipe T having an end portion E of the pipe T heated to a predetermined temperature (greater than the vitreous transition temperature Tg) designed to allow the deformation,
- moving, up to a predetermined distance, relative to each other said end portion E of the pipe T and said pad 2, towards each other in the direction of a longitudinal central axis X2 of the pipe T, for fitting said end portion E on the assembly of said pad 2, said annular gasket G and said annular element 4.

The method also comprises the following steps:

- heating the annular contact element 4 to a predetermined temperature (greater than the vitreous transition temperature) in such a way as to heat by contact the inner surface of the portion of the end pipe T fitted on the annular contact element 4 and, simultaneously, heating from the outside said pipe T made of thermoplastic material fitted on the forming pad 2, in a predetermined zone of the pad 2 (a zone which, more precisely, extends from the area proximal to the region 3 for housing said annular gasket G up to the end edge C of the pipe T);
- moving said annular contact element 4 from the advanced position P1 to the withdrawn position P2, to release (not make contact with) the annular contact element 4 from the gasket G and from the pipe T.

According to yet another aspect, the annular contact element 4 is provided with a second seat S2 for housing a portion of the gasket G and the step of positioning said annular contact element 4 in the advanced position P1 comprises a step of receiving at least a portion of the gasket G inside the second housing seat S2.

According to yet another aspect, the forming pad 2 is provided with a first annular seat S1 for housing the gasket G, facing radially towards the outside of the pad 2, and the step of fitting said end portion E of the pipe T on the assembly of said pad 2 and said annular gasket G comprises a step of receiving at least a portion of the gasket G inside the first annular seat S1 of the forming pad 2.

According to another aspect, the step of preparing an annular gasket G on said forming pad 2 in a predetermined position comprises a step of fitting said gasket G on the forming pad 2 and moving the annular contact element 4 from the withdrawn position P2 to the advanced position P1 to make contact with the gasket G and move it to the predetermined position of said forming pad 2.

According to yet another aspect, before the step of moving, up to a predetermined distance, relative to each other said end portion E of the pipe T and the pad 2, the method comprises a step of clamping the pipe by closing a clamp 10.

According to another aspect, the method comprises a step of releasing the pipe T by opening the clamp 10 for a predetermined time, after the steps of:

- moving, up to a predetermined distance, relative to each other said end portion E of the pipe T and said forming pad 2, towards each other in the direction of a longitudinal central axis X2 of the pipe T;
- positioning said annular contact element 4 in the advanced position P1, for making contact with the pipe T and the gasket G of the pipe;
- heating to a predetermined temperature, from the inside and, simultaneously, heating to a predetermined temperature, from the outside, the end portion E of a pipe T made of thermoplastic material in the zone which extends from the housing region 3 in which said annular gasket G is positioned up to the end edge C of the pipe, for a predetermined time.

According to yet another aspect, the step of releasing the pipe by opening the clamp 10 is carried out before, or partly superposing on, a step of moving said annular contact element 4 from the advanced position P1 to the withdrawn position P2, so as to release it from the gasket G and from the pipe T.

According to another aspect, the method comprises, after the step of releasing the pipe T by opening the clamp 10 for a predetermined time, a step of further clamping the pipe T by closing the clamp 10.

According to yet another aspect, the method comprises, after the step of moving said annular contact element 4 from the advanced position P1 to the withdrawn position P2, to release from the gasket G of the pipe T, a step of moving the annular contact element 4 from the withdrawn position P2 of disengagement towards the advanced position P1 of engagement, up to an intermediate position P3 of engagement of the annular contact element 4 with an end part of the pipe T between the gasket G and the end edge of the pipe T.

Advantageously, this allows a bell B to be obtained wherein the gasket G has a desired final internal diameter, since the end of the pipe T is stressed by the annular element 4, when it is still in a malleable phase (not completely cooled), allowing the pipe T and seat of the gasket to be modelled so that, once the pipe T has cooled, the gasket G has the correct final diameter and can correctly receive the coupling of another pipe.

In the process for forming the bell, when the wall of the pipe T has formed completely on the gasket G and on the pad 2 and the step of cooling and final stabilising of the bell has still not been activated, the response to the mechanical stress of the wall of the bell, even though mainly elastic, is, in general, elasto-plastic.

In particular, the plastic behaviour is accentuated in the zone of the bell adjacent to the front shoulder of the gasket G up to the end edge of the bell.

In effect, this zone has been subjected to the transmission of the heat of the hot chamber and, thanks also to this heating, has maintained a residual plasticity.

If during this step of the process for forming the bell an advancing movement of the annular contact element 4 towards the edge of the bell of the pipe T is activated, moving the annular contact element 4 to a predetermined height at which the edge of the bell is pressed, a beneficial release of the radial pressure action of the wall of the bell is applied on the gasket G.

During this step, the gasket G is compressed and flattened by the wall of the bell towards the pad 2.

The gasket G is elastic; so, even if the inner wall of the bell in the zone of the gasket expands, the gasket G always maintains the adhesion to the inner wall of the bell, that is to say, it recovers elastically part of the previous flattening. Simultaneously, the progressive cooling of the wall of the bell of the pipe T continues, so that at the end of the contact action with the edge of the pipe T of the annular contact element 4, that is, when the annular contact element 4 is moved from the intermediate position P3 to the withdrawn position P2, the elastic relaxation of the gasket G is partly preserved, since the mechanical response of the part of the bell to the stress induced by the annular contact element 4 is not completely elastic, but elasto-plastic.

This partial relaxation of the gasket G is sufficient to ensure that, after extracting the pad 2 from the definitively cooled bell, the internal diameter of the pipe T at the gasket is the one desired (necessary for the correct functionality of inserting a further pipe in the bell with a guarantee of the seal).

FIGS. 5 to 23 are briefly described below which illustrate, in detail, the method according to the invention.

FIGS. 5 to 23 show the steps of the belling cycle.

Figure 5:
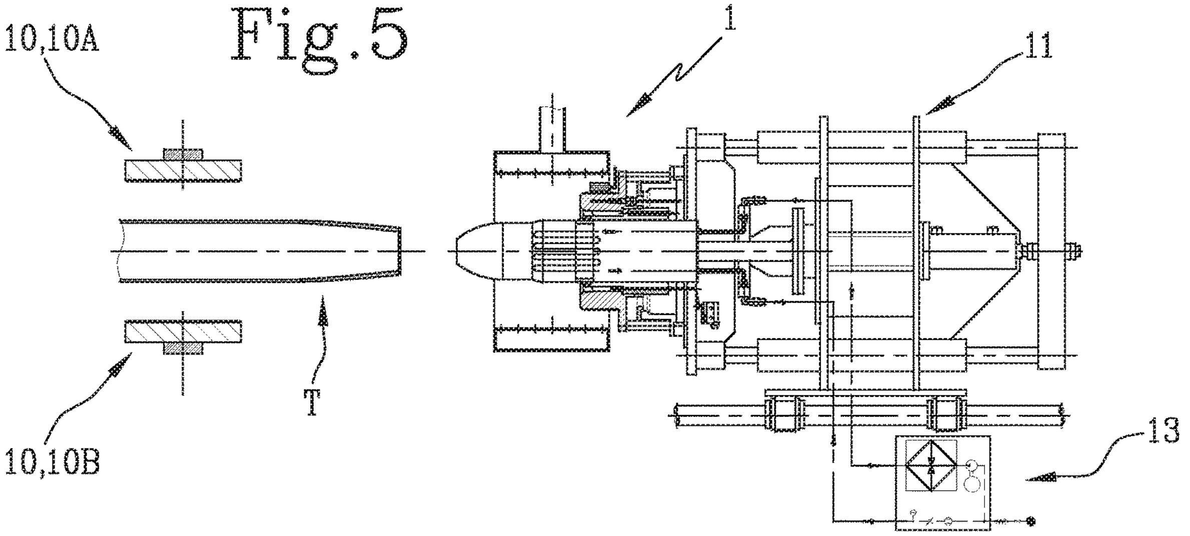
FIGS. 5 to 23 schematically illustrate the belling unit of FIG. 4A and the pipe, in different sequential steps of making the bell on an end of the pipe.

FIG. 5 illustrates the step of positioning the pipe T inside the clamp 10.

As is evident, the pipe T is positioned with its axis X2 aligned with (coinciding with) the axis X1 of the forming pad 2 (coinciding with the axis of the contact element 4).

Figure 6:
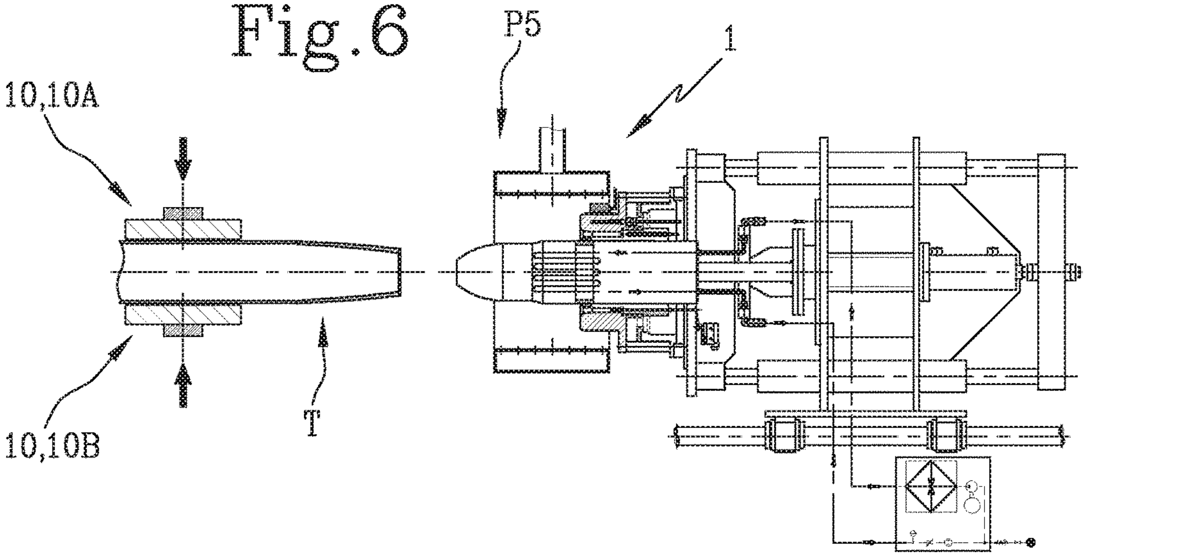
Figure 7:
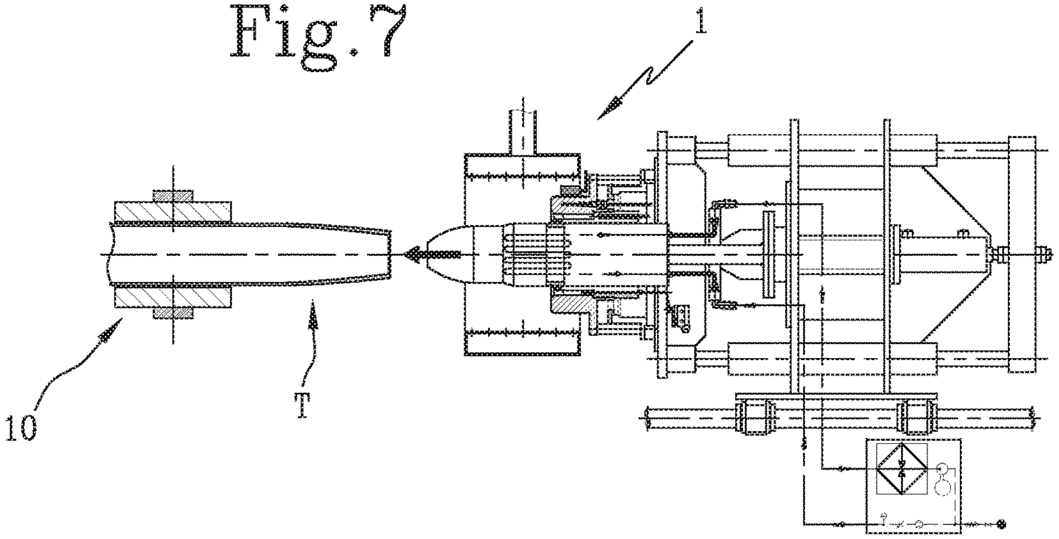
Figure 8:
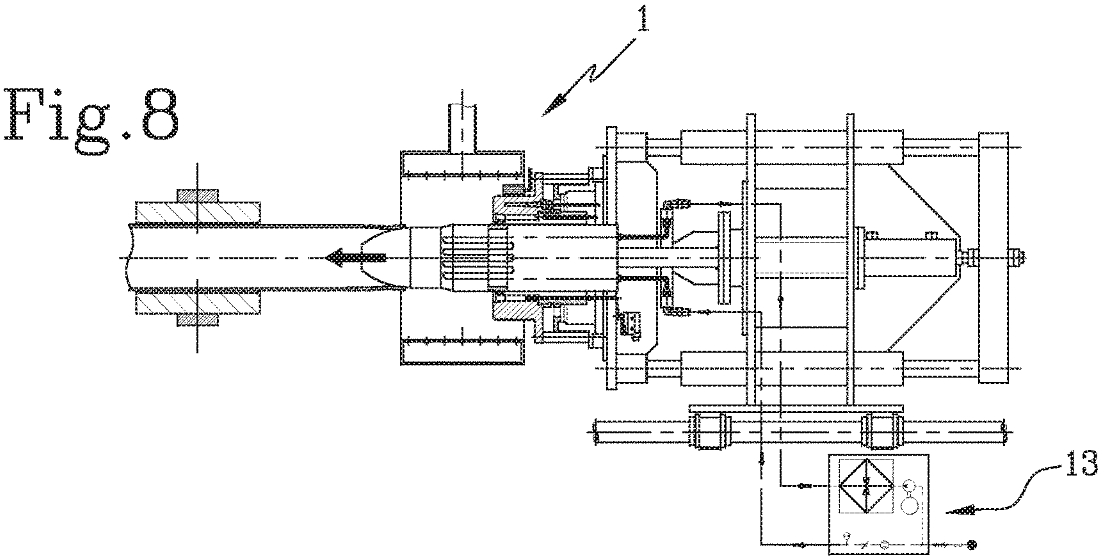
Figure 9:
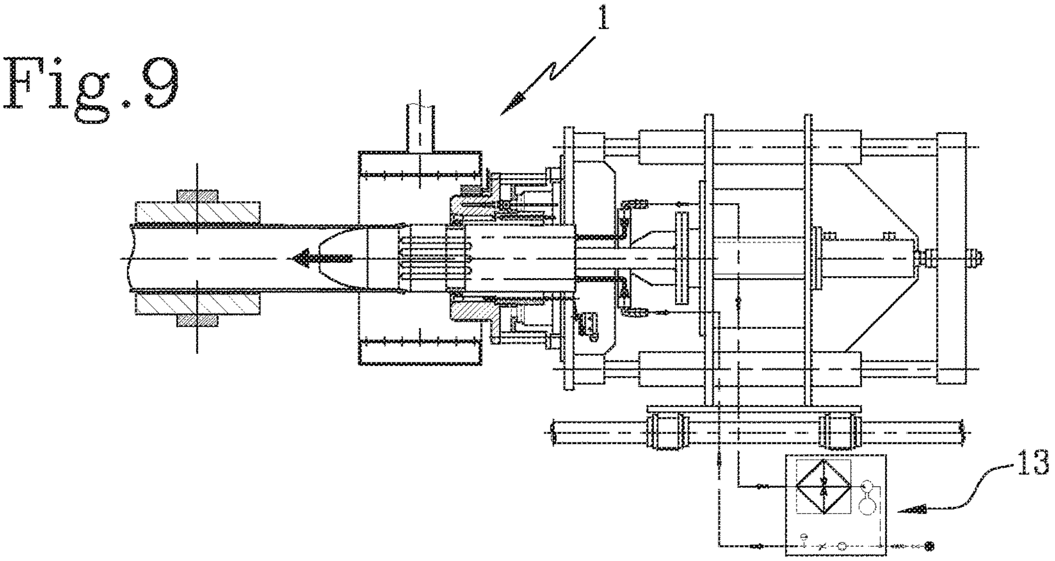
Figure 10:
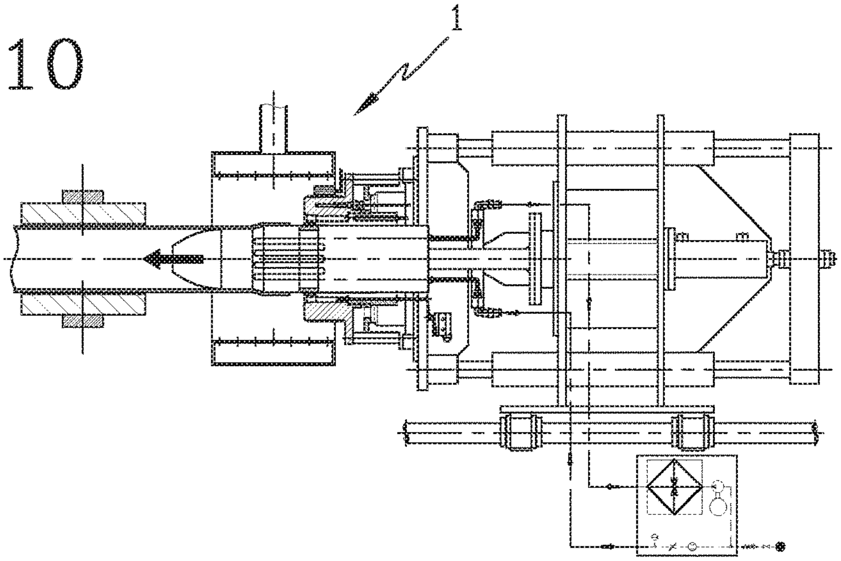
Figure 11:
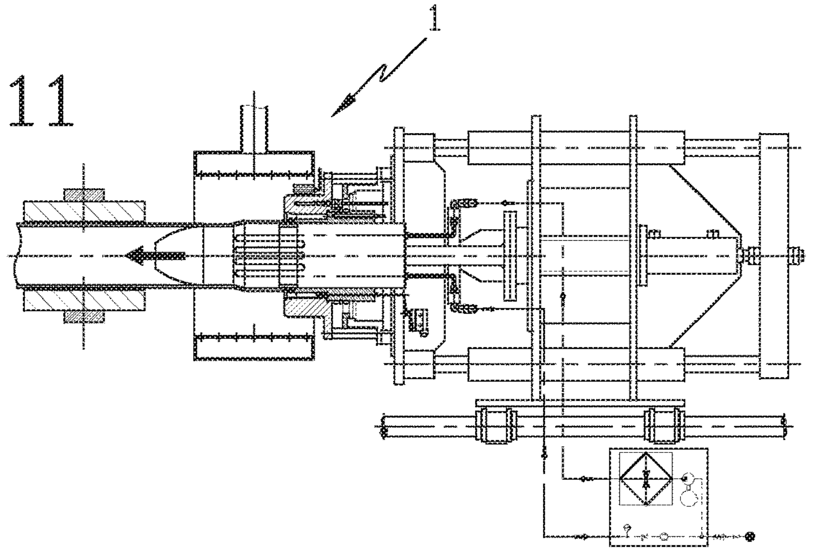
Figure 12:
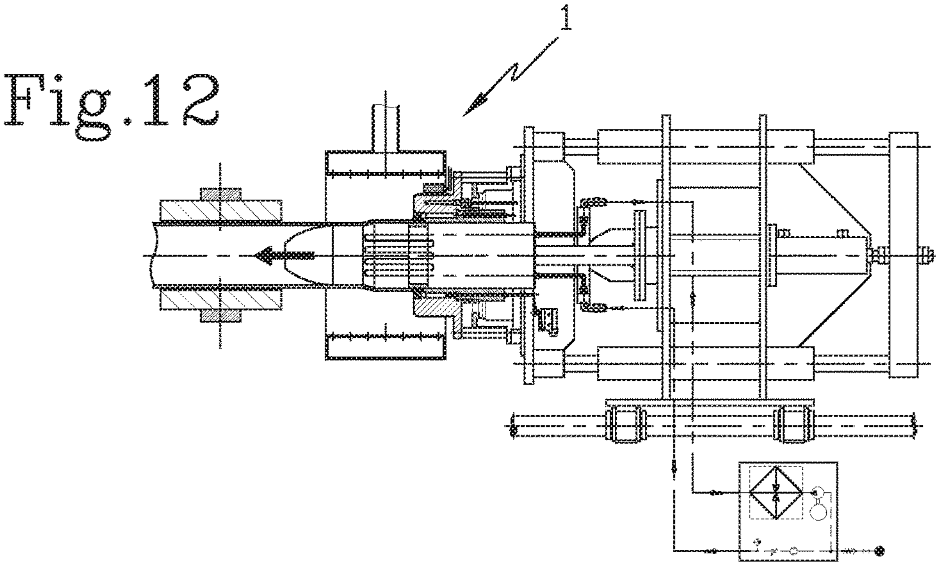
Figure 13:
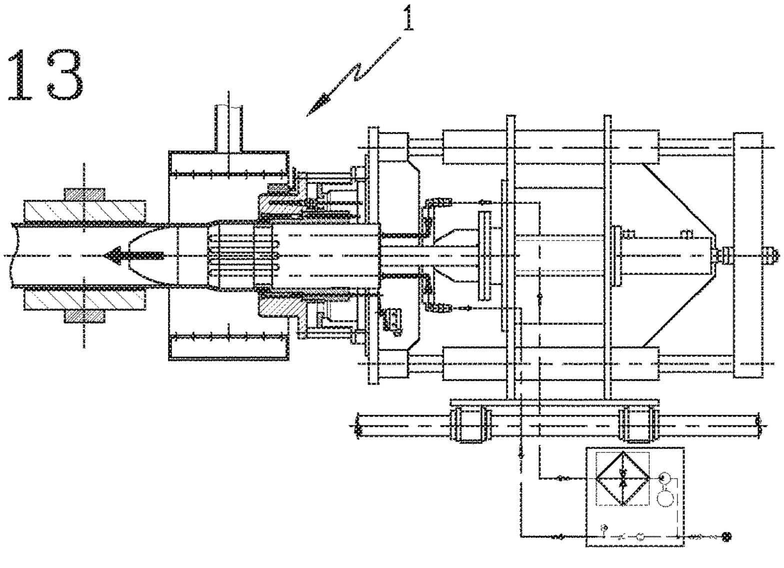
Figure 14:
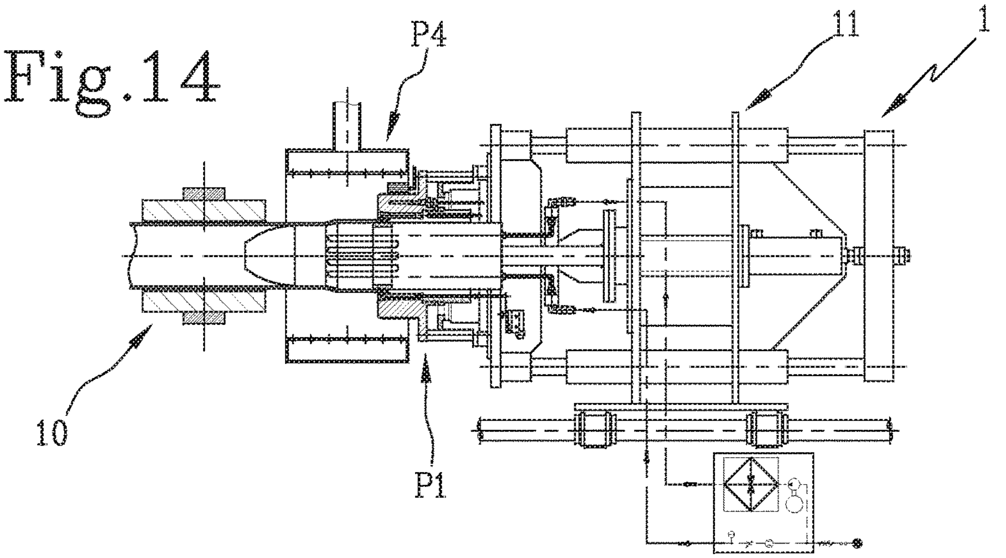

FIG. 6 illustrates the step of closing the clamp 10. The pipe T is locked between the jaws 10A, 10B of the clamp 10.

FIGS. 7 to 14 illustrate the advancing of the carriage 11 towards the pipe T, in different advancing positions, respectively. During these steps, the pipe T is progressively inserted on the forming pad 2 (the pipe is fitted on the forming pad 2, inserted in the gasket G and lastly in the annular contact element 4, that is to say, inserted in the hot chamber 21).

During these steps, the carriage 11 is moved from the far position P5 to the close position P4.

Figure 15:
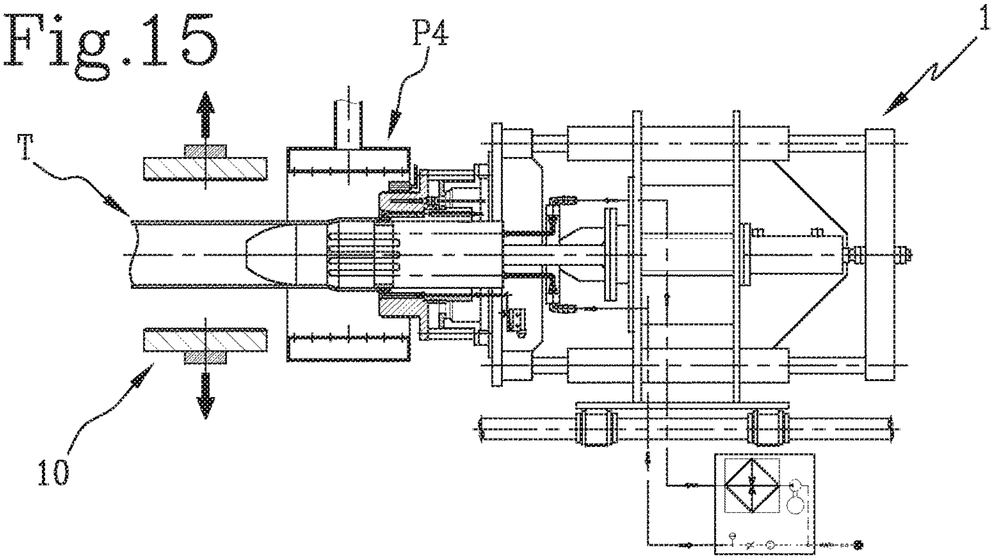

FIG. 15 illustrates a step wherein the carriage 11 is in the close position P4 and the annular contact element 4 in the advanced position P1.

During this step, the clamp 10 is in the open configuration, that is, the respective jaws (10A, 10B) are open.

The drawing shows the start of the step of extending the bell being formed, wherein the jaws 10A, 10B of the clamp 10 are kept open for a predetermined time.

Figure 16:
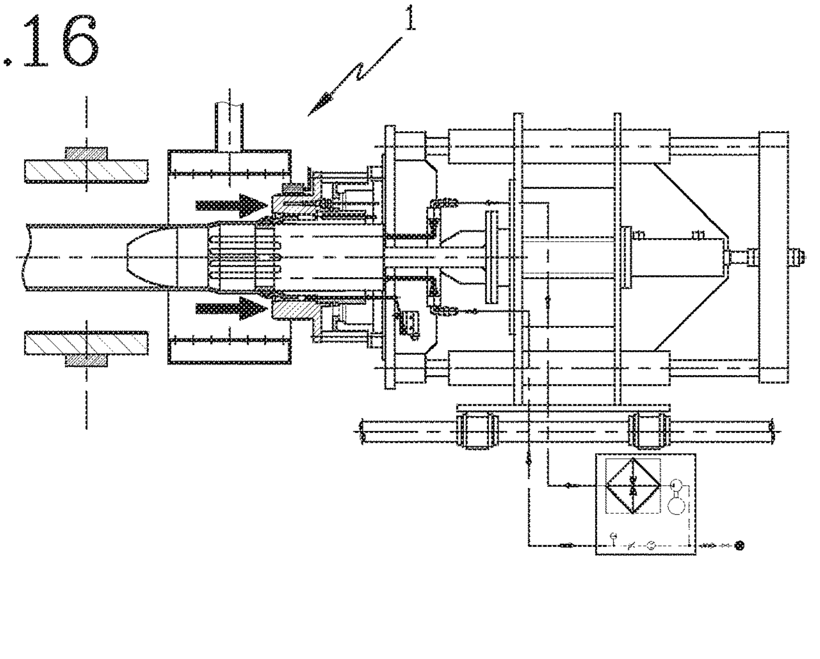
Figure 17:
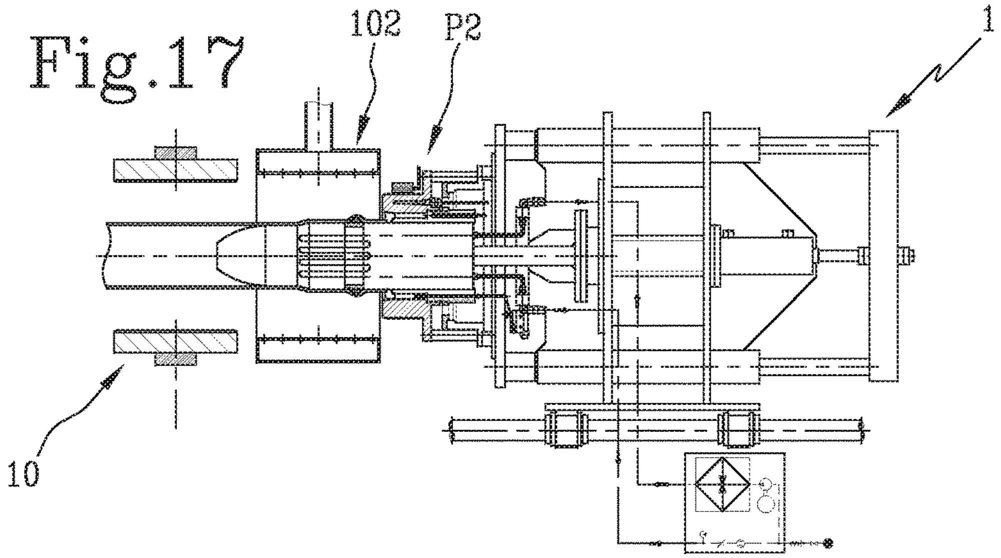

FIG. 16 illustrates the continuation of the step of extending the bell.

During this step, the clamp 10 is in the open configuration, the carriage 11 in the close position P4 and the annular contact element 4 starts the movement from the advanced position P1 towards the withdrawn position P2.

Starting from the step of inserting the pipe T in the gasket G, until the end of the extension step, the first heating device 6 is activated, for heating the inside of the pipe and, simultaneously, the second heating device 5 is activated, for heating from the outside the pipe T made of thermoplastic material.

Both the heating devices (5, 6) contribute to heating the end zone of the pipe T which extends from the seat of the gasket G to the end edge C of the pipe T.

Figure 18:
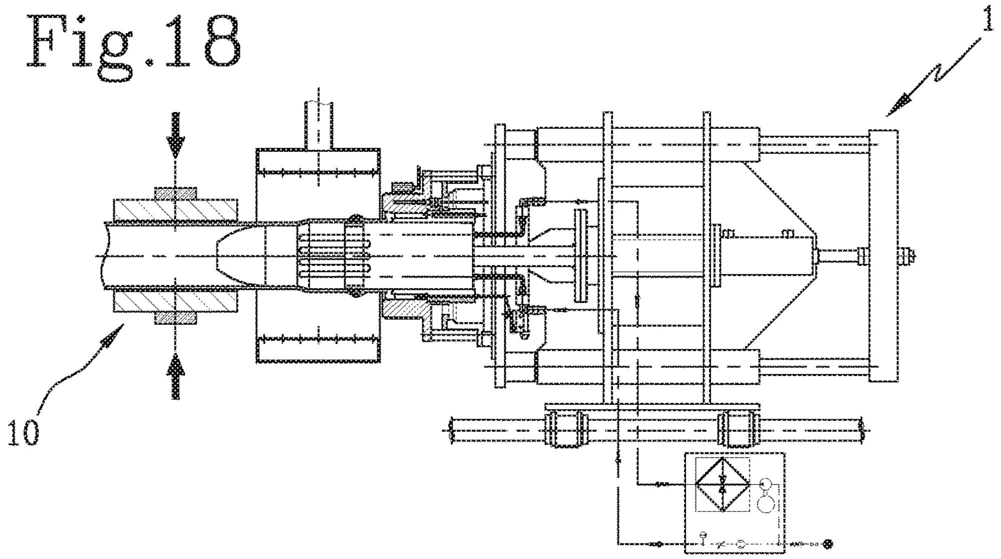

FIG. 18 illustrates the end of the step of extending the bell.

During this step, the clamp 10 is in the closed configuration.

Figure 19:
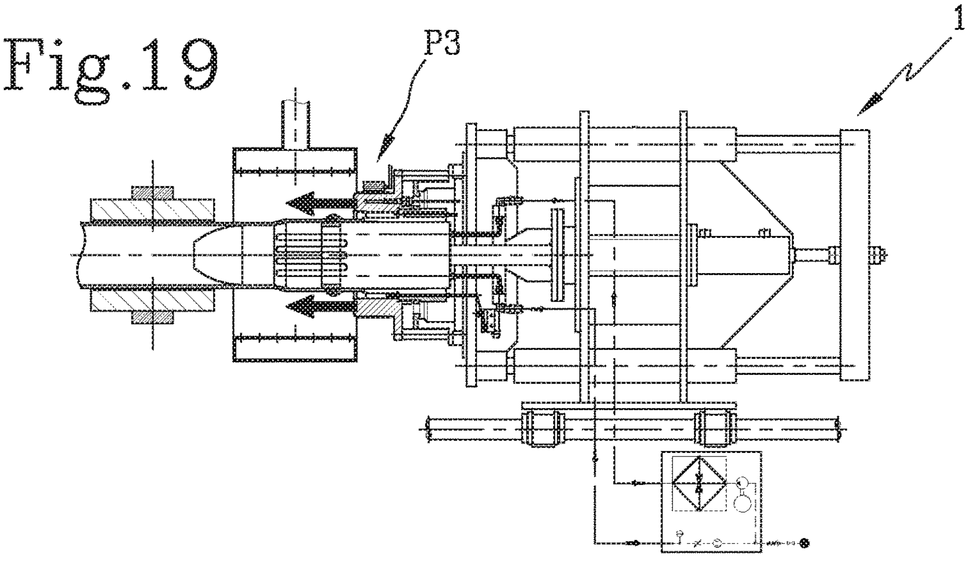

FIG. 19 illustrates the step wherein the annular contact element 4 is moved towards the pipe T (towards the advanced position P1), that is to say, it is moved to an intermediate position P3 (between the advanced position P1 and the withdrawn position P2) in which it engages with the edge of the bell of the pipe T.

In this way, the annular contact element 4 strikes and compresses the edge of the bell.

The annular contact element 4 is kept in this intermediate position for engaging with the edge of the pipe T for a predetermined time, to allow an elastic relaxation of the gasket G and the fitting of the edge of the pipe T.

This step defines an elastic relaxation of the gasket G and the fitting of the edge of the pipe T.

Figure 20:
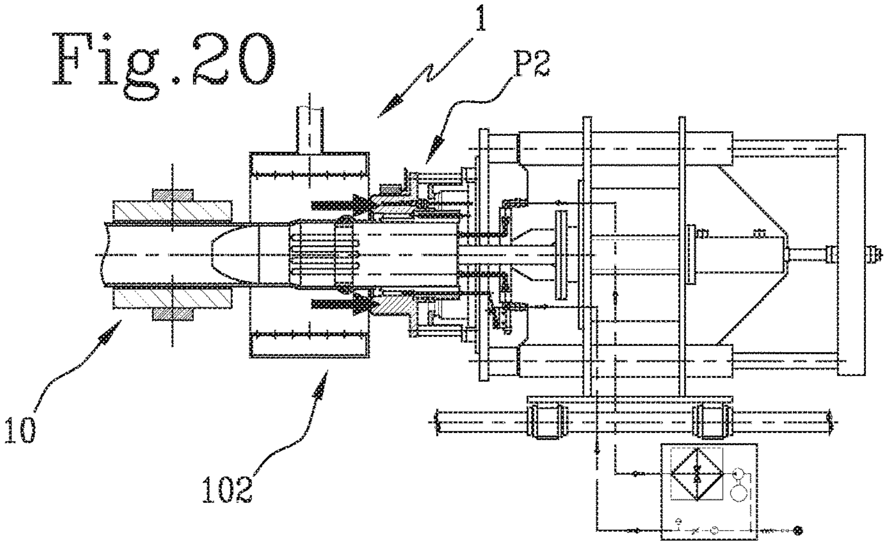

FIG. 20 illustrates the end of elastic relaxation of the gasket G and the fitting of the edge of the pipe T.

The annular contact element 4 is moved away from the pipe T, towards the withdrawn position P2.

Figure 21:
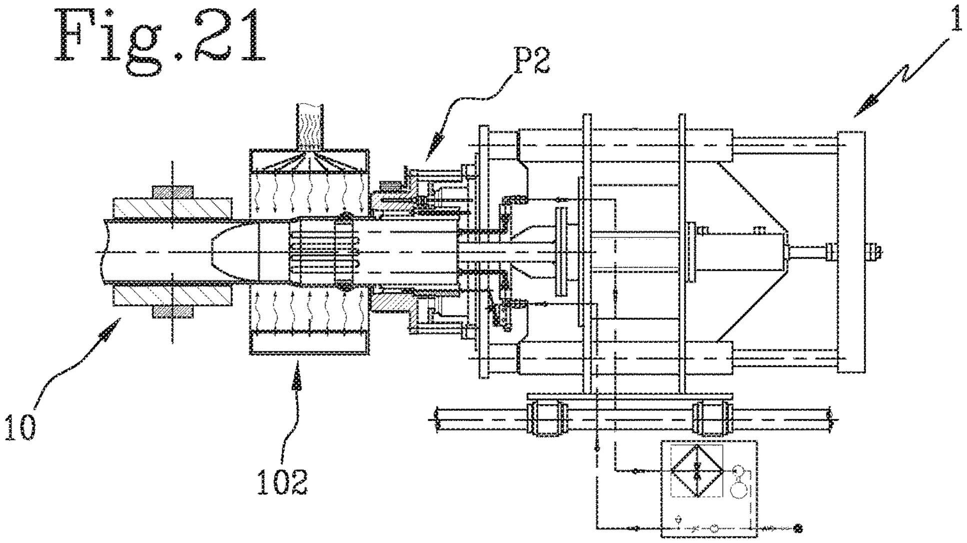

FIG. 21 illustrates the annular contact element 4 in the withdrawn position P2 of disengagement (it does not engage in any way the gasket G and/or the pipe T).

The bell is still hot and, during this step the cooling (using the cooling unit 102) of the end E of the pipe T starts.

Figure 22:
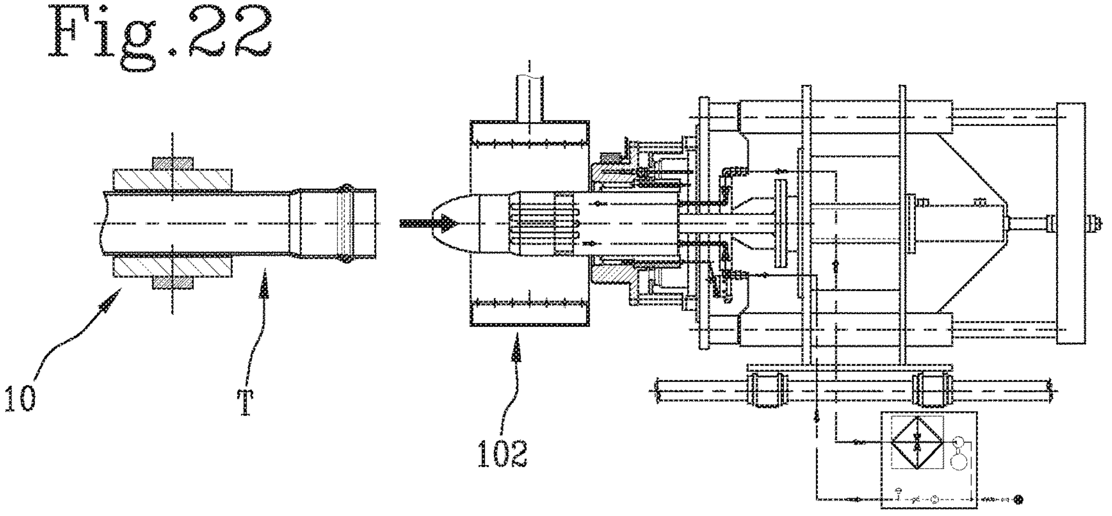

FIG. 22 illustrates the bell of the pipe T made, with the clamps 10 still closed. During this step, the carriage 11 is moved towards the far position P5, for disengaging the pad 2 from the pipe T.

Figure 23:
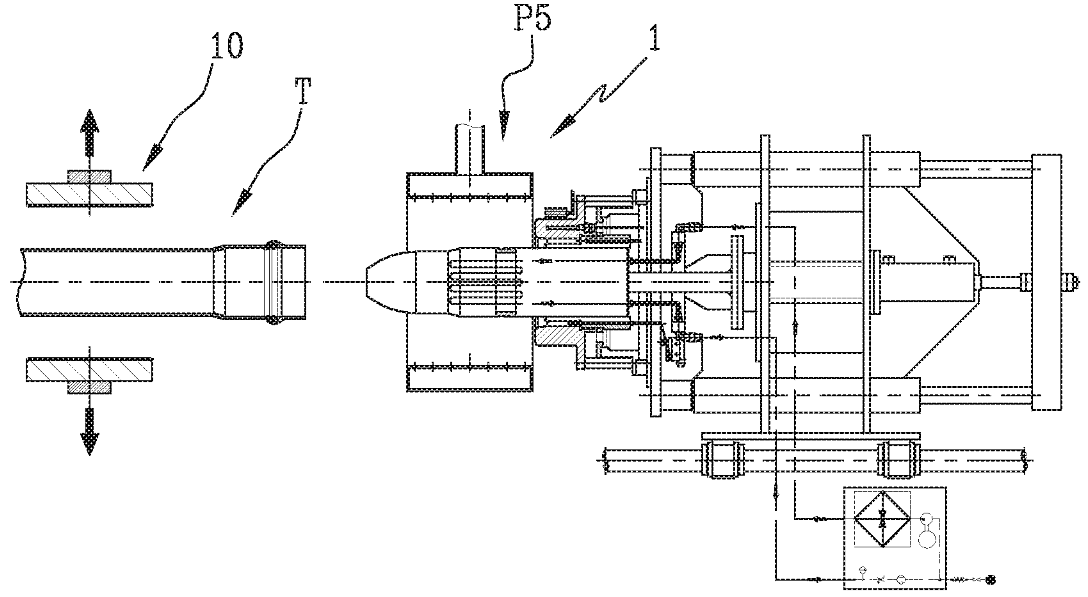

FIG. 23 illustrates the clamp 10 in the open configuration. During this step, the pipe T (with the bell made and the gasket G inserted inside the pipe) is extracted from the unit 1.

FIGS. 24 to 32 illustrate, with greater precision in detail (in terms of time), what occurs during the process for forming the bell of the pipe T according to the invention.

Figure 24:
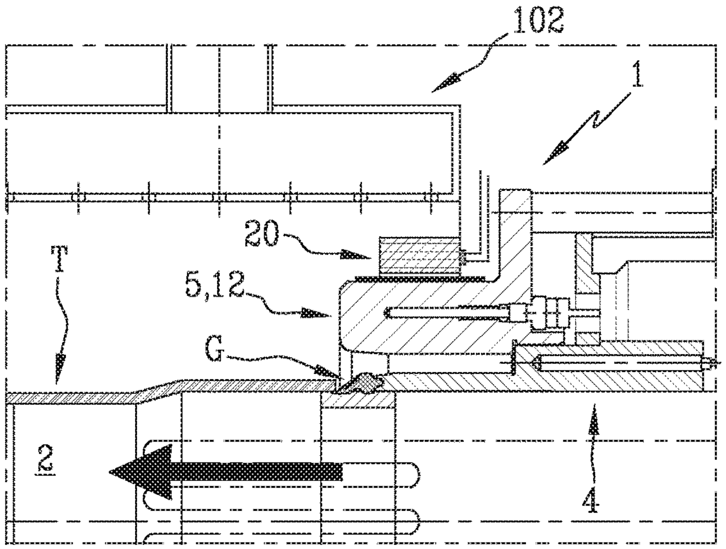
FIGS. 24 to 32 illustrate further details of the forming of the bell of the pipe according to the invention.
Figure 25:
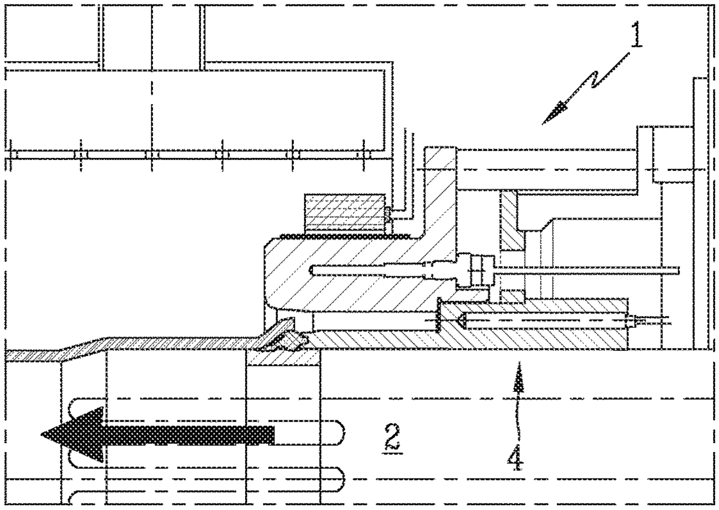
Figure 26:
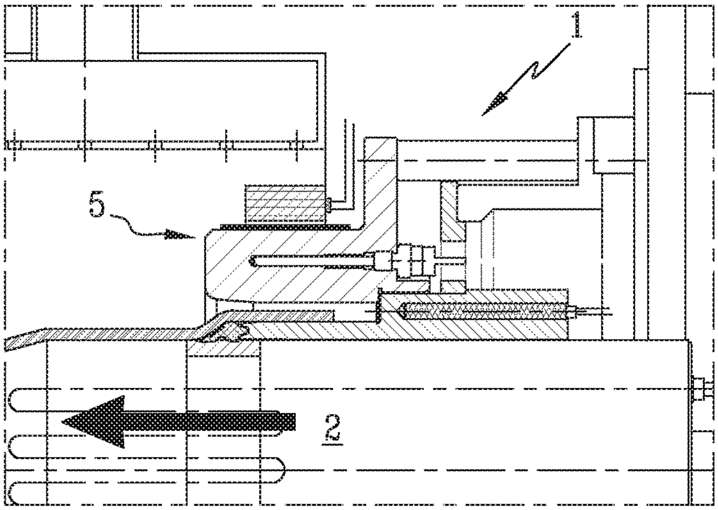
Figure 27:
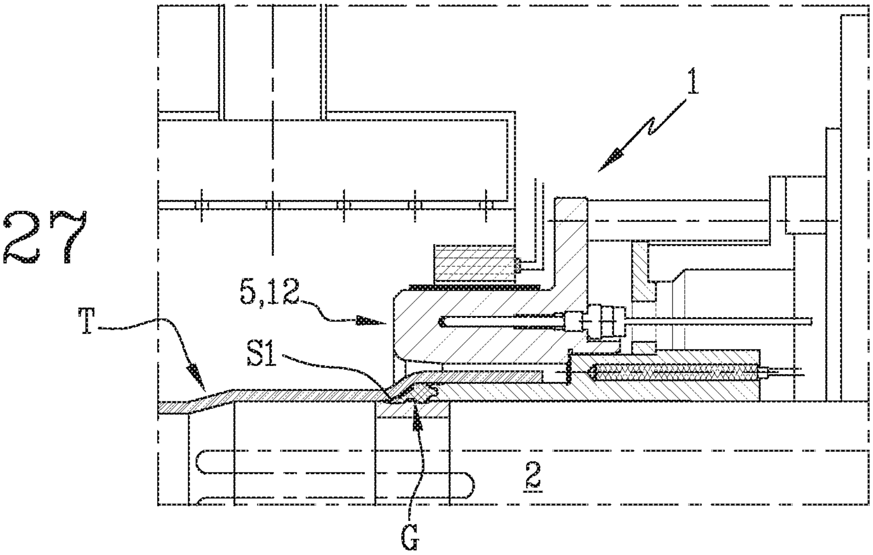
Figure 28:
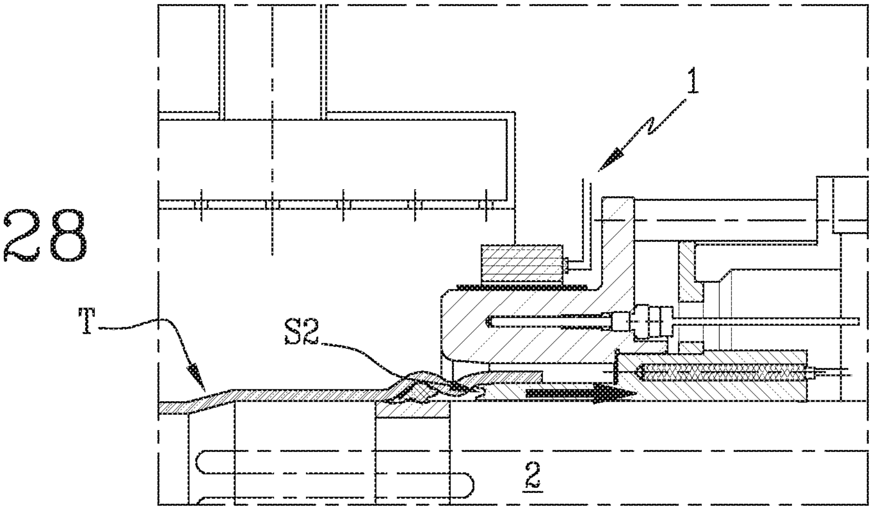
Figure 29:
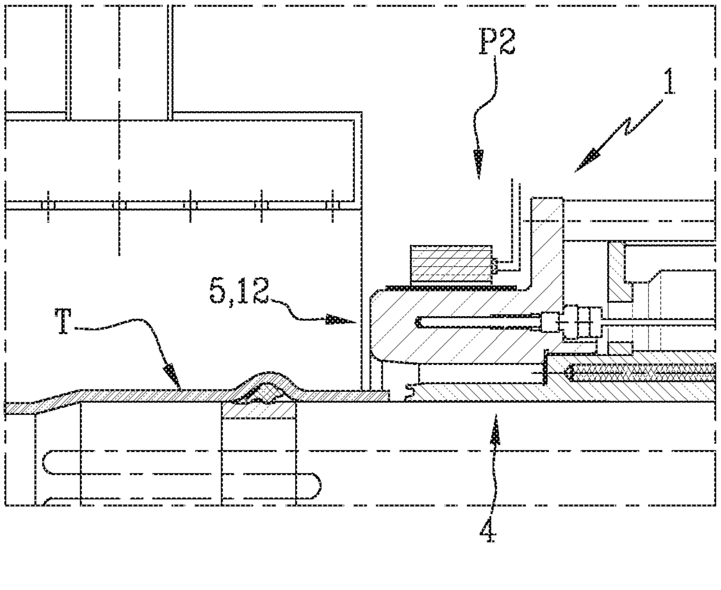
Figure 30:
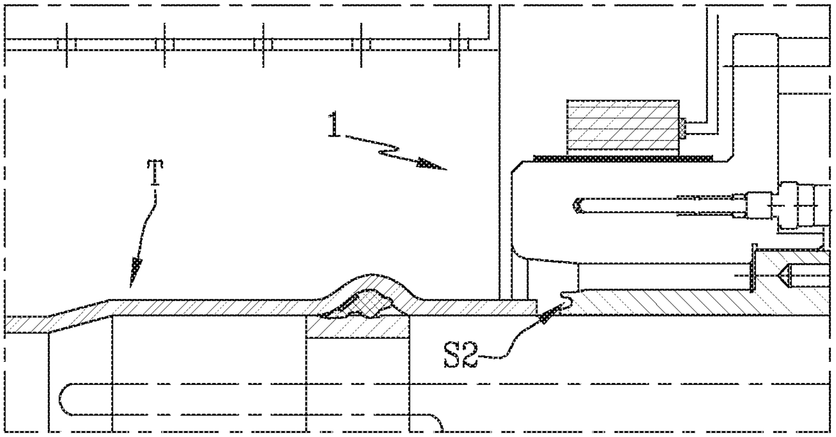

In FIGS. 24 to 26 the carriage 11 is moved towards the pipe T; in FIG. 28 the annular element 4 is moved towards the withdrawn position P2.

Figure 4A:
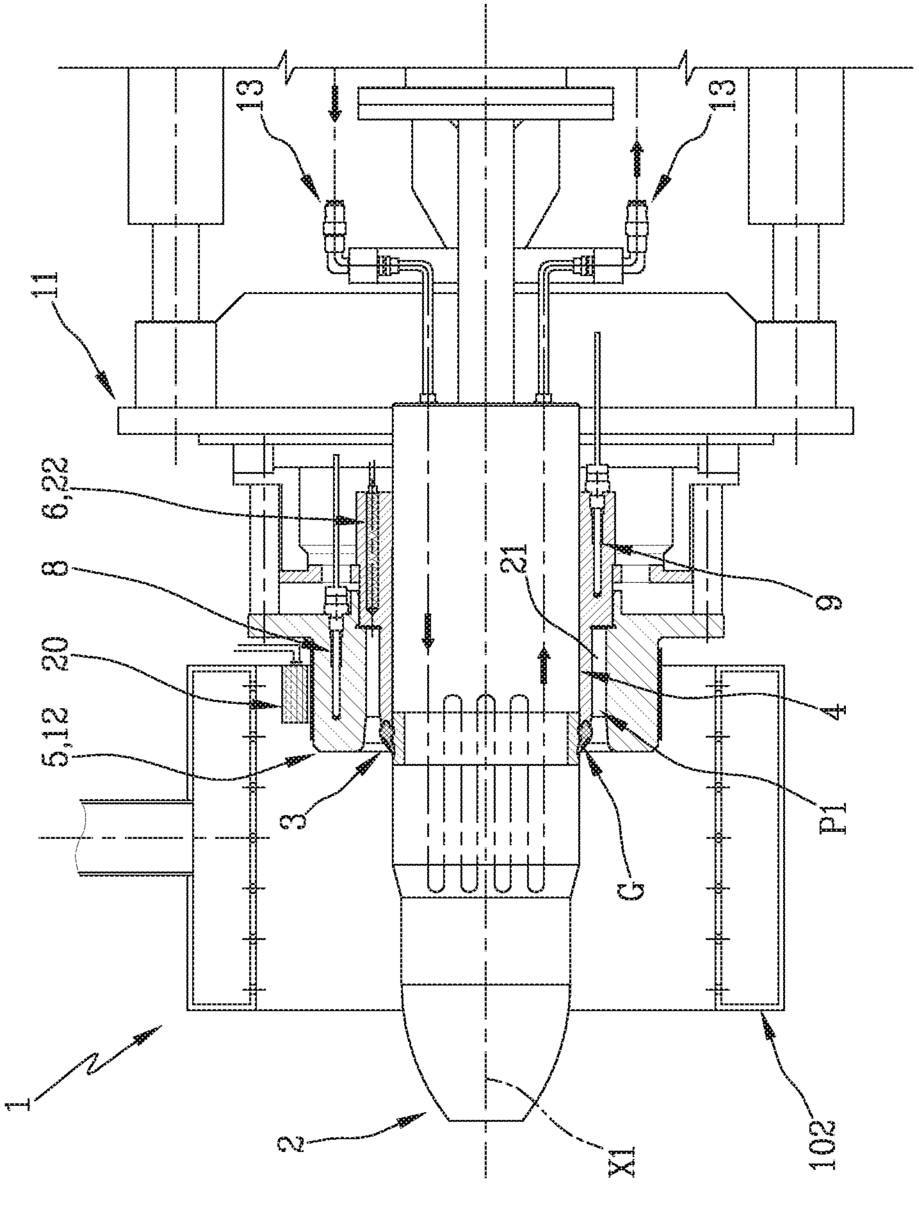
FIG. 4A is a partial cross section of a belling unit forming part of the machine of FIGS. 1 and 2, according to the invention.
Figure 4B:
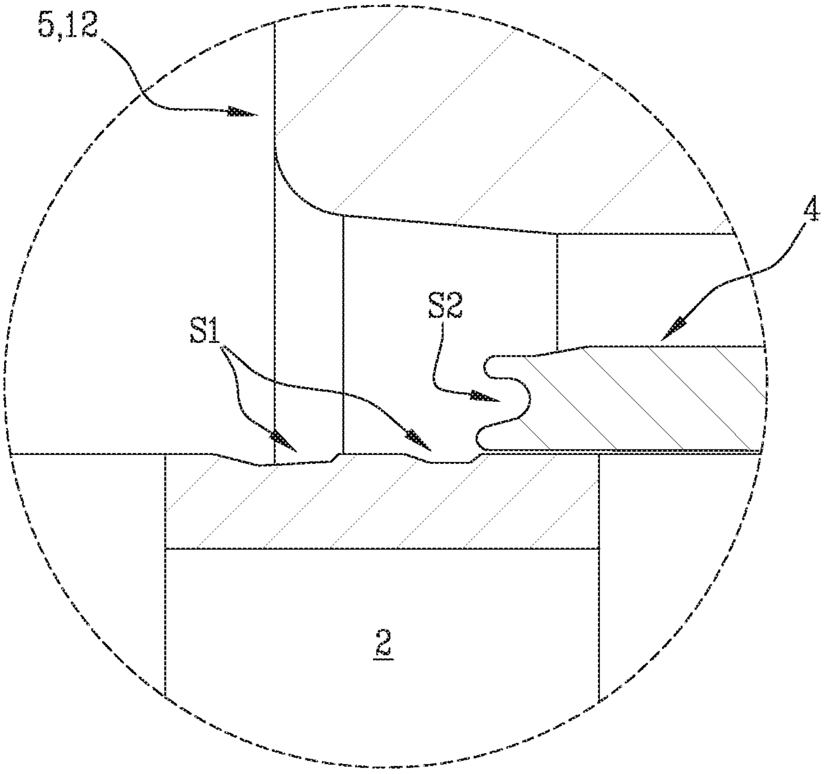
FIG. 4B illustrates an enlargement of FIG. 4A (in which the gasket of the pipe is not shown)
Figure 31:
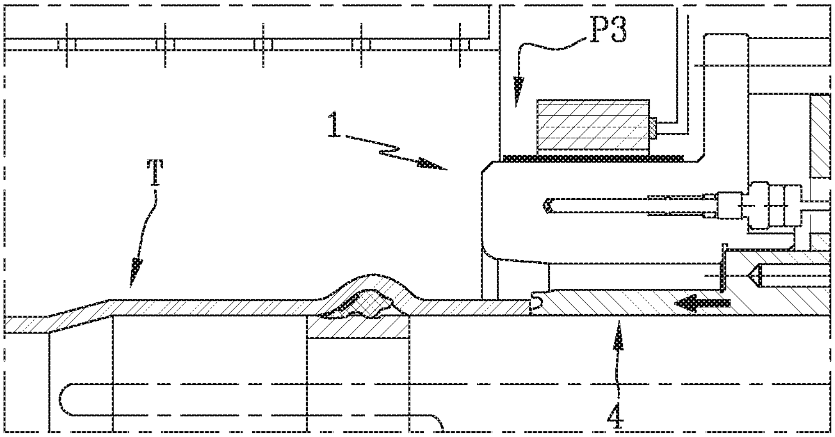
Figure 32:
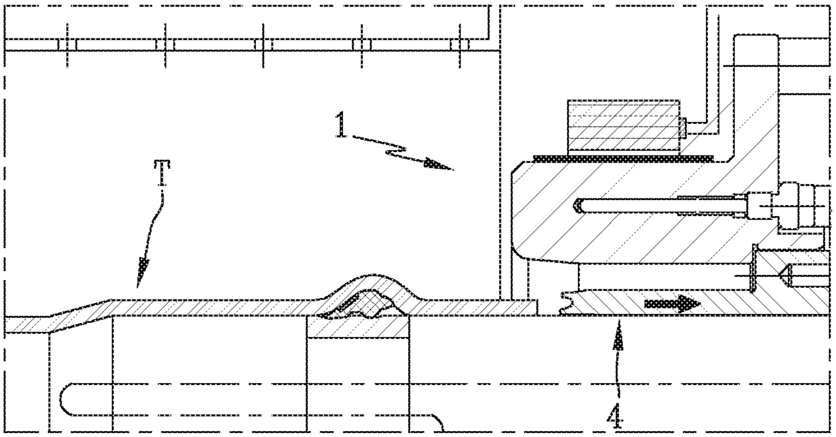

In FIG. 31 the annular element 4 is moved towards the close position P1, more specifically until reaching a predetermined intermediate contact position P3 with the edge of the pipe T (prior to being moved again towards the withdrawn position P2, see FIG. 4).

It should be noted that, according to the method described and the unit 1 described above, the gasket G is locked permanently inside the pipe T (for the shape coupling and for the bond between the materials of the pipe T and the gasket G which are established during the processing).

Advantageously, the belling unit 1 and the method described, and according to the appended claims, allow a bell to be obtained in a PVC-O pipe, according to the RIEBER method, even with considerable thicknesses of walls.

The belling unit 1 and the method are extremely efficient, and allow a bell to be made in a PVC-O pipe of very high quality (both as regards the dimensional and constructional features of the bell, and with regard to the coupling between the gasket and the pipe and the relative seal during coupling of the pipe with other pipes).

The invention claimed is:

1. A belling unit for belling pipes made of biaxially oriented polyvinyl chloride PVC-O thermoplastic material, comprising:

a forming pad for deforming into a bell shape, an end portion of a pipe, the pipe being made of PVC-O thermoplastic material, said forming pad having a longitudinal central axis of symmetry and a region for housing an annular gasket configured to be coupled, internally, to the pipe;

an annular contact element fitted slidably on said forming pad to move along a direction of said longitudinal central axis, between an advanced position of contact of the annular gasket, and a withdrawn position;

a first heating device, configured for heating the annular contact element to a predetermined temperature to heat by contact an inner surface of the end portion fitted on the annular contact element;

a second heating device, configured for heating from outside said pipe fitted on the forming pad, in a predetermined zone of the forming pad at the end portion; and a carriage slidably movably with respect to a frame of the belling unit, the carriage commonly supporting the forming pad, the first heating device and the second heating device, such that the forming pad, the first heating device and the second heating device form an integrated unit.

2. The belling unit according to claim 1, wherein said forming pad includes an annular first seat for housing at least a first part of said annular gasket.

3. The belling unit according to claim 2, wherein said annular contact element includes a second seat for housing at least a second part of said annular gasket.

4. The belling unit according to claim 1, and further comprising a control and operating unit configured to control the belling unit.

5. The belling unit according to claim 4, and further comprising a first sensor configured for measuring a first temperature at said first heating device, and wherein the control and operating unit is configured for adjusting said first heating device as a function of a first temperature value measured by the first sensor, for heating the annular contact element to the predetermined temperature.

6. The belling unit according to claim 5, and further comprising a second sensor configured for measuring a second temperature at said second heating device, and wherein the control and operating unit is configured for adjusting said second heating device as a function of a second temperature value measured by the second sensor, for heating the end portion to the predetermined temperature.

7. The belling unit according to claim 1, wherein the second heating device is as an annular heating element configured to form with the annular contact element, heated by the first heating device, a hot chamber sized to contain internally at least the end portion enclosing the annular contact element, said end portion enclosing the annular contact element having a relative inner surface in contact with a surface of the annular contact element and a relative outer surface detached from a surface facing the annular heating element.

8. A machine for belling pipes made of PVC-O thermoplastic material, comprising:
- the belling unit according to claim 1;
- a heating unit for heating the pipe to a predetermined heating temperature;
- a cooling unit for cooling the pipe, operatively positioned with said belling unit, for cooling the pipe fitted on said forming pad.

9. The machine according to claim 8, and further comprising a pre- heating unit, positioned upstream of the heating unit, and configured for heating the pipe to a predetermined pre-heating temperature, which is lower than the predetermined heating temperature.

10. A method for belling pipes made of biaxially oriented polyvinyl chloride (PVC-O) thermoplastic material, comprising the following steps:
- providing a forming pad configured to deform into a bell shape, an end portion of a pipe made of PVC-O thermoplastic material, said forming pad having a longitudinal central axis of symmetry and a region for housing an annular gasket configured to be coupled, internally, to the pipe;
- providing an annular contact element, fitted slidably on said forming pad, and movable along a direction of said longitudinal central axis, between an advanced position, and a withdrawn position;
- providing a first heating device, configured for heating the annular contact element to a predetermined temperature, to heat by contact an inner surface of the end portion fitted on the annular contact element;
- providing a second heating device, configured for heating from outside said pipe fitted on the forming pad, in a predetermined zone of the forming pad at the end portion;
- providing an annular gasket on said forming pad in a predetermined region, said annular gasket being configured to be stably positioned in the bell shape to be formed;
- providing a carriage slidably movably with respect to a frame of the belling unit, the carriage commonly supporting the forming pad, the first heating device and the second heating device, such that the forming pad, the first heating device and the second heating device form an integrated unit;
- positioning said annular contact element in the advanced position to make contact with the annular gasket provided in the predetermined region;
- providing a pipe having the end portion heated to a predetermined temperature to allow the deformation;
- moving, up to a predetermined distance, relative to each other said end portion and said forming pad, towards each other in the direction of the longitudinal central axis of the pipe, for fitting said end portion on an assembly of said forming pad, said annular gasket and said annular contact element; and
- heating the annular contact element to the predetermined temperature using the first heating device to heat by the contact the inner surface of the end portion of surrounding the annular contact element and, simultaneously, using the second heating device to heat said pipe from the outside.

11. The method according to claim 10, and further comprising providing the forming pad with an annular first seat for housing the annular gasket, facing radially towards an outside of the forming pad, and wherein the step of providing the annular gasket on said forming pad in the predetermined region comprises a step of receiving at least a first portion of the annular gasket inside the annular first seat of the forming pad.

12. The method according to claim 10, and further comprising providing the annular contact element with a second seat for housing a second portion of the annular gasket and wherein the step of providing the annular gasket on said forming pad in the predetermined region comprises a step of receiving at least a second portion of the annular gasket inside the second seat.

13. The method according to claim 10, wherein the step of using the second heating device to heat the pipe from the outside, comprises providing that the second heating device includes an annular heating element having an inner surface surrounding the end portion of the pipe and spaced, radially, from an outer surface of the pipe by a distance of between 1 mm and 10 mm.

14. The method according to claim 10, wherein the steps of using the first heating device to heat by the contact the inner surface of the end portion surrounding the annular contact element and, simultaneously, and using the second heating device to heat said pipe from the outside, comprise:
- a step of closing the pipe using a clamp, and a step of releasing the pipe by opening the clamp for a predetermined time, after the steps of:
  - moving, up to a predetermined distance, relative to each other said end portion and said forming pad, towards each other in the direction of the longitudinal central axis of the pipe positioning said annular contact element in the advanced position, for making contact with the pipe and the annular gasket of the pipe.

15. The method according to claim 14, wherein the step of releasing the pipe by opening the clamp is carried out before, or partly superposing on, a step of moving said annular contact element from the advanced position to the withdrawn position, to release said annular contact element from the annular gasket and from the pipe.

16. The method according to claim 14, and further comprising, after the step of releasing the pipe by opening the clamp for the predetermined time, a step of further clamping the pipe by closing the clamp.

17. The method according to claim 10, and further comprising, after the step of heating the annular contact element to the predetermined temperature using the first heating device to heat by the contact the inner surface of the end portion of surrounding the annular contact element and, simultaneously, using the second heating device to heat said pipe from the outside, a step of moving said annular contact element from the advanced position to the withdrawn position, to release from the pipe, and a subsequent step of moving the annular contact element from the withdrawn position towards the advanced position, to an intermediate position for engaging the annular contact element for contact with an edge of the pipe, for compressing the edge of the pipe.

18. The method according to claim 10, wherein the first heating device includes at least one electrical resistor and the second heating device includes an annular heating element.

19. The belling unit according to claim 1, wherein the first heating device includes at least one electrical resistor and the second heating device includes an annular heating element.

* * * * *